No. 810,058. PATENTED JAN. 16, 1906.
P. W. KANE.
VARIABLE SPEED GEAR.
APPLICATION FILED DEC. 31, 1904.
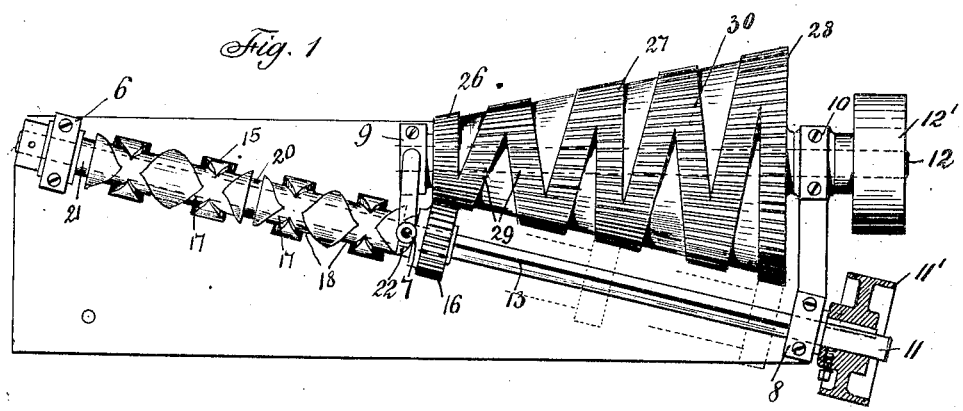
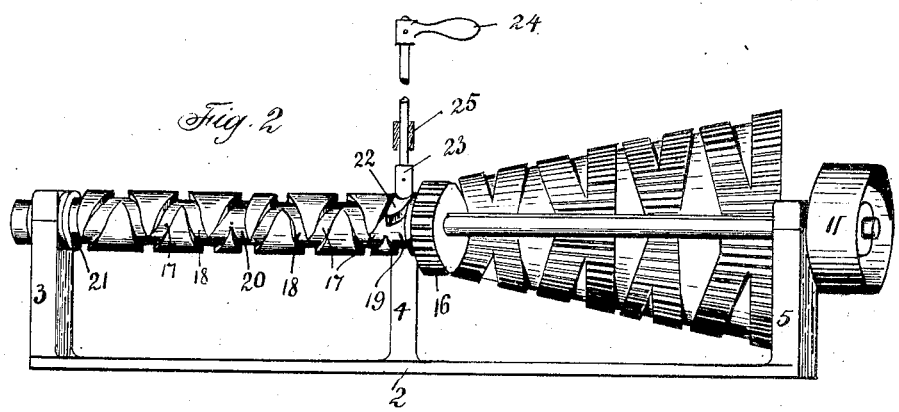
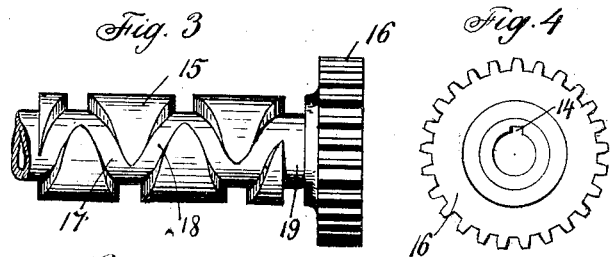
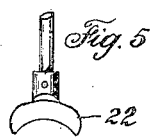
Witnesses
L. Abraham.
A. Koetschau
Inventor
Peter Wm Kane
By Robt Klotz
Atty

UNITED STATES PATENT OFFICE.

PETER WILLIAM KANE, OF MASON CITY, IOWA.

VARIABLE-SPEED GEAR.

No. 810,058.  Specification of Letters Patent.  Patented Jan. 16, 1906.

Application filed December 31, 1904. Serial No. 239,181.

*To all whom it may concern:*

Be it known that I, PETER WILLIAM KANE, a citizen of the United States, residing at Mason City, in the county of Cerro Gordo and State of Iowa, have invented certain new and useful Improvements in Variable-Speed Gears, of which the following is a specification.

This invention relates to gear-wheel transmission, and has particular reference to means for changing from one speed to another with the use of cog-wheels. The object of the invention is to provide in combination with a train of gear-wheels of different diameters means for transferring the intermeshing gear-wheel from one wheel to another wheel of different diameter without causing a sudden change in speed and without interruption in the transmission of power. For this purpose I provide spiral gears between the wheels in the train of gears up and down which the intermeshing wheel may travel from one gear to another and at the same time gradually raise or lower the variations in velocity ratio to the objective ratio and without for a moment throwing the driving and the driven gears out of mesh.

My invention consists in a novel construction and arrangements of parts, hereinafter described in detail, illustrated in the drawings, and incorporated in the claims.

In the drawings, Figure 1 is a top plan view of a system of gears and their operating mechanism embodying my invention. Fig. 2 is a side elevation thereof. Fig. 3 is an enlarged detail view showing a portion of the sleeve carrying the wheel intermeshing with the change-gears. Fig. 4 is a view of Fig. 3, taken on a vertical plane at right angles to the vertical plane of Fig. 3. Fig. 5 is an elevation of the guide and a portion of its actuating-shaft. Fig. 6 is the top plan view thereof.

Referring to the drawings, 2 is a base upon which are bearing-standards 3, 4, and 5, on the upper ends of which are bearings 6, 7, 8, 9, and 10 for shafts 11 and 12. On the shafts 11 and 12 are pulleys 11' and 12', respectively, so that either shaft may be used as the driving or the driven shaft. In the shaft 11 is a key or rib 13, engaging a keyway or slot 14 in the grooved sleeve 15, upon which is rigidly mounted a gear-wheel 16. In the sleeve 15 are right and left screw-threads or spiral grooves 17 and 18, arranged in opposite directions. Said sleeve also contains circular grooves 19, 20, and 21, in one of which the guide 22 normally travels. Said guide is rotatively mounted upon a shaft 23, held in the bearing 9 and having a handle 24, by means of which the guide 22 is moved in and out of alinement with the spiral grooves 17 and 18. An auxiliary bearing 25 is provided to steady the shaft 23. On the shaft 12, mounted in bearings 9 and 10, is a train of gear-wheels 26, 27, and 28. The gears 26 and 27 are connected by a spiral toothed track or spiral gear 29, and gears 27 and 28 are connected by a similar gear or track 30. The spiral or inclined gears connecting said change-gears form a cone of gears, and their teeth are therefore beveled, as shown. The pitch of the screw-threads 17 and 18 is the same as the pitch of the spiral gears, and to effect change from one gear to another the gear 16 and sleeve 15 are moved by the shoe or guide 22 being caused to engage one of the spiral grooves or screw-threads. Starting from the position shown in Figs. 1 and 2, the gear 16 may be moved to gear 27 by rotating the point of guide 22 in line in the pitch of groove 17. The point of junction of its groove 17 with a circular groove 19 is in the same plane as the point of junction between gear-wheel 26 and the spiral gear 29, and as the guide moves the sleeve 15 to the right wheel 16 is moved laterally in mesh with the spiral gear, its lateral movement being to the same extent as the length of path traversed through groove 17, thus bringing the wheel 16 to the wheel 27 at the moment guide 22 is in spiral groove 20. If the operator desires to stop wheel 16 in mesh with wheel 27, he will rotate handle 23 to bring guide 22 in line with the circular groove 20, stopping the endwise movements of sleeve 18. If, however, he desires to continue the movement of wheel 16 until it reaches wheel 28, the guide 22 is held inclined in line with the groove 17 until said guide reaches circular groove 21. To return wheel 16, the opposite point of shoe 22 is turned into the thread or groove 18. In this manner the transmission from one to the other of the variable-speed gears is effected without throwing the wheel 16 out of mesh and without causing sudden jars which would take place if wheel 16 was thrown out of mesh with wheel 26 directly into mesh with wheel 27. The spiral gear not only affords a path over which the wheel 26 may travel from one change-gear to another, but said track also simultaneously transmits to or receives motion from said wheel 16. The operation will of course be the same whether the motion is transmitted from the variable gears to the gear 16, or vice versa.

It is obvious that numerous modifications may be made in the minor details of embodiment of my invention without departing from the spirit thereof, and I therefore do not wish to confine my invention to the specific details of construction herein shown and described.

Having thus described my invention, I claim as new and desire to secure by Letters Patent—

1. The combination with a cone of gears consisting of a plurality of parallel gear-wheels and a spiral gear crossing said gear-wheels and forming parts of the latter at the points of crossing, of a movable gear-wheel 16, means for guiding the latter automatically to follow the path of said spiral gear, said means adjustable to hold said movable gear in mesh with either of said parallel gear-wheels.

2. The combination with a pair of shafts, of a series of change-gears on one shaft, a sleeve-bearing having a gear-wheel thereon provided with oppositely-inclined screw-threads and a series of circular grooves therein, and a guide for shifting said sleeve-bearing to move said gear-wheel from one to another of said change-gears.

3. The combination with a cone of gears comprising parallel and spiral gears, of a shaft 13, a sleeve-shaft and the gear-wheel 16 movably mounted on said shaft 13, said sleeve-shaft having the oppositely-arranged spiral grooves and the circular grooves, and the guide 22 arranged to hold said sleeve-shaft stationary on shaft 13, or to move said sleeve-shaft along said shaft 13, substantially as and for the purpose set forth.

In testimony whereof I have hereunto set my hand in the presence of two subscribing witnesses.

PETER WILLIAM KANE.

Witnesses:
D. W. TELFORD,
J. J. MOORE.